(12) United States Patent
Banerjee et al.

(10) Patent No.: US 11,770,365 B2
(45) Date of Patent: Sep. 26, 2023

(54) CONTEXTUAL AWARENESS WITH INTERNET OF THINGS (IOT) INFRASTRUCTURE FOR MANAGED DEVICES

(71) Applicant: VMWARE, INC., Palo Alto, CA (US)

(72) Inventors: Swarnadeep Banerjee, Bangalore (IN); Arvind Maan, Bangalore (IN); Ashish Maan, Bangalore (IN); Nitin Sethi, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 425 days.

(21) Appl. No.: 16/354,229

(22) Filed: Mar. 15, 2019

(65) Prior Publication Data

US 2020/0228497 A1 Jul. 16, 2020

(30) Foreign Application Priority Data

Jan. 10, 2019 (IN) .............................. 201941001171

(51) Int. Cl.
*H04L 29/06* (2006.01)
*H04L 9/40* (2022.01)
*H04L 12/28* (2006.01)

(52) U.S. Cl.
CPC ........ *H04L 63/029* (2013.01); *H04L 12/2807* (2013.01); *H04L 12/2834* (2013.01); *H04L 63/0876* (2013.01); *H04L 63/102* (2013.01)

(58) Field of Classification Search
CPC . H04L 63/029; H04L 12/2807; H04L 63/102; H04L 63/0876; H04L 12/2834; H04L 12/2809; H04L 12/2832
See application file for complete search history.

(56) References Cited

U.S. PATENT DOCUMENTS

| | | | |
|---|---|---|---|
| 10,057,813 B1* | 8/2018 | Likar | H04L 63/0846 |
| 2014/0167929 A1* | 6/2014 | Shim | G08C 17/02 |
| | | | 340/12.5 |
| 2017/0013062 A1* | 1/2017 | Kim | H04L 12/2818 |
| 2018/0184298 A1* | 6/2018 | Chen | H04W 48/20 |
| 2018/0270079 A1* | 9/2018 | Chamarajnager | H04L 41/046 |
| 2020/0021670 A1* | 1/2020 | Agerstam | H04L 12/283 |
| 2020/0092701 A1* | 3/2020 | Arnberg | H04W 8/005 |
| 2020/0162843 A1* | 5/2020 | Bolen | H04B 17/318 |
| 2020/0375012 A1* | 11/2020 | Betz | B60Q 3/80 |

* cited by examiner

*Primary Examiner* — Brian J. Gillis
*Assistant Examiner* — Juan C Turriate Gastulo
(74) *Attorney, Agent, or Firm* — Thomas | Horstemeyer, LLP (57) ABSTRACT

Disclosed are various examples for providing contextual awareness with an internet of things (IoT) infrastructure in an enterprise workspace. IoT devices can connect to a network through a gateway or other edge device enrolled in a management service. The gateway device can provide context-based services defined by the management services to users in an enterprise through interactions with IoT devices. A gateway device can identity managed user devices within a service range of the gateway device. When a managed user device is within the service range of the gateway device, the gateway device can provide a context-based service by interacting with connected IoT devices.

20 Claims, 4 Drawing Sheets

FIG. 5

CONTEXTUAL AWARENESS WITH INTERNET OF THINGS (IOT) INFRASTRUCTURE FOR MANAGED DEVICES

RELATED APPLICATIONS

Benefit is claimed under 35 U.S.C. 119(a)-(d) to Foreign Application Serial No. 201941001171 filed in India entitled "CONTEXTUAL AWARENESS WITH INTERNET OF THINGS (IOT) INFRASTRUCTURE FOR MANAGED DEVICES", on Jan. 10, 2019, by VMWARE, Inc., which is herein incorporated in its entirety by reference for all purposes.

BACKGROUND

Appliances, vehicles, sensors, controllers, actuators, and other devices can gather data and interact with the physical world. This network of devices or Internet-of-Things (IoT) can be utilized to improve operations and provides new services. Different types of IoT devices have different capabilities that can be useful in interacting with the physical world. For example, IP-enabled thermostats can be remotely controlled to adjust to a specific setting and can further provide real-time sensor data. Further, IP-enabled lighting systems can be controlled to adjust to particular settings.

In order to ensure the security and reliability of IoT device connections in an enterprise setting, the enterprise can utilize a management service capable of protecting IoT device data, as well as email, corporate documents, and other enterprise data from theft, data loss, and unauthorized access. Client devices, edge devices, and other devices can be required to authenticate with the management service to ensure secure management communications. For example, a client device such as a cellular phone, a tablet, a computer, or another device can authenticate with the management service using credentials created by or otherwise associated with an end user of the client device. In order to access a network, IoT devices can connect through a gateway or another edge device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing contextual awareness with an internet of things (IoT) infrastructure in an enterprise. Different IoT devices can provide a variety of different functionalities and can utilize different communication protocols. In an enterprise setting, managed user devices can interact with the different IoT devices through a gateway device according to the different functionalities of the different IoT devices. In order to provide data and interact with the physical world, IoT devices can connect to a network through a gateway or another edge device. A management service can enroll and manage the gateway device in order to ensure secure interaction with the IoT devices.

In an enterprise setting, a management system can enforce security policies of the enterprise on user devices, such as smartphones, tablets, laptops, and other suitable devices. The policies can include, for example, restrictions or permissions pertaining to capabilities of a device such that access to enterprise data is secured on the device. For instance, an enterprise or other organization can manage BYOD devices of contractors, employees, clients, customers, or other personnel to protect data from theft, loss, and unauthorized access.

According to various implementations, a management system can further manage gateway devices or other edge devices that interact with the IoT devices accessible in the enterprise environment. As such, the management system can manage the gateway device and configure the gateway device to interact with IoT devices in the enterprise to ensure secure interaction between devices in the enterprise workspace. Managed gateway or other edge devices can be installed in various locations in an organization according to a particular context and can interact with the IoT devices and/or managed user devices based on defined and managed configurations associated with the particular context. The proposed infrastructure enables users in an enterprise environment to benefit from the contextual-based services provided by gateway devices and/or IoT devices while protecting the enterprise from theft, loss, and unauthorized access.

In one context-based example, an IoT device can include a sensor in a parking garage that can determine which parking spots in a parking garage are available. In this example, when a managed user device is within the predefined range of an installed gateway device that can communicate with the parking sensor, the user device can transmit a request for open parking spaces. The gateway device can receive the request from the user device, authenticate the user device through the management system, and obtain data from the sensor device with respect to available parking spots. In response to receiving the parking data from the sensor device, the gateway device can transmit the parking data to the managed user device.

In another context-based example, an IoT device can include a printer. In an enterprise environment, some documents can contain confidential information. According to various implementations, documents are printed only when the user of the requesting managed device is within a predefined range of the installed gateway device, thereby reducing potential security risks and or issues with unauthorized users having access to confidential documents. In this example, when a managed user device is within the predefined ranged of the gateway device that can communicate with the printer, the gateway device can detect the user managed device, receive an instruction to print to the printer device from the managed device, and instruct the printer to proceed with printing the requested document. As such, the documents are printed only when the user of the managed device is within proximity of the printer.

In another context-based example, a user can enter a meeting room within an organization. The meeting mom can contain IoT devices (e.g., television, blinds, lighting, thermostat, projector, etc.) that can be adjusted accordingly for a particular meeting. A gateway device located in the meeting room can interact with the IoT devices according to a behavior defined by the management service with respect to a meeting context. Accordingly, when a user enters the meeting room, the gateway device can detect the managed user device of the user and proceed with interacting with the IoT devices in response to a service request from the managed user device and/or the functionalities defined by the management service.

In another context-based example, a doctor can be provided data related to a patient as the doctor enters the waiting room to visit the patient. For example, a gateway device in the waiting room can detect the presence of the doctor's managed user device. Once the doctor's device is authenticated with the management service, the gateway device can interact with an IoT device to obtain information related to the patient that can then be automatically transmitted to the doctor's device.

Figure 1:
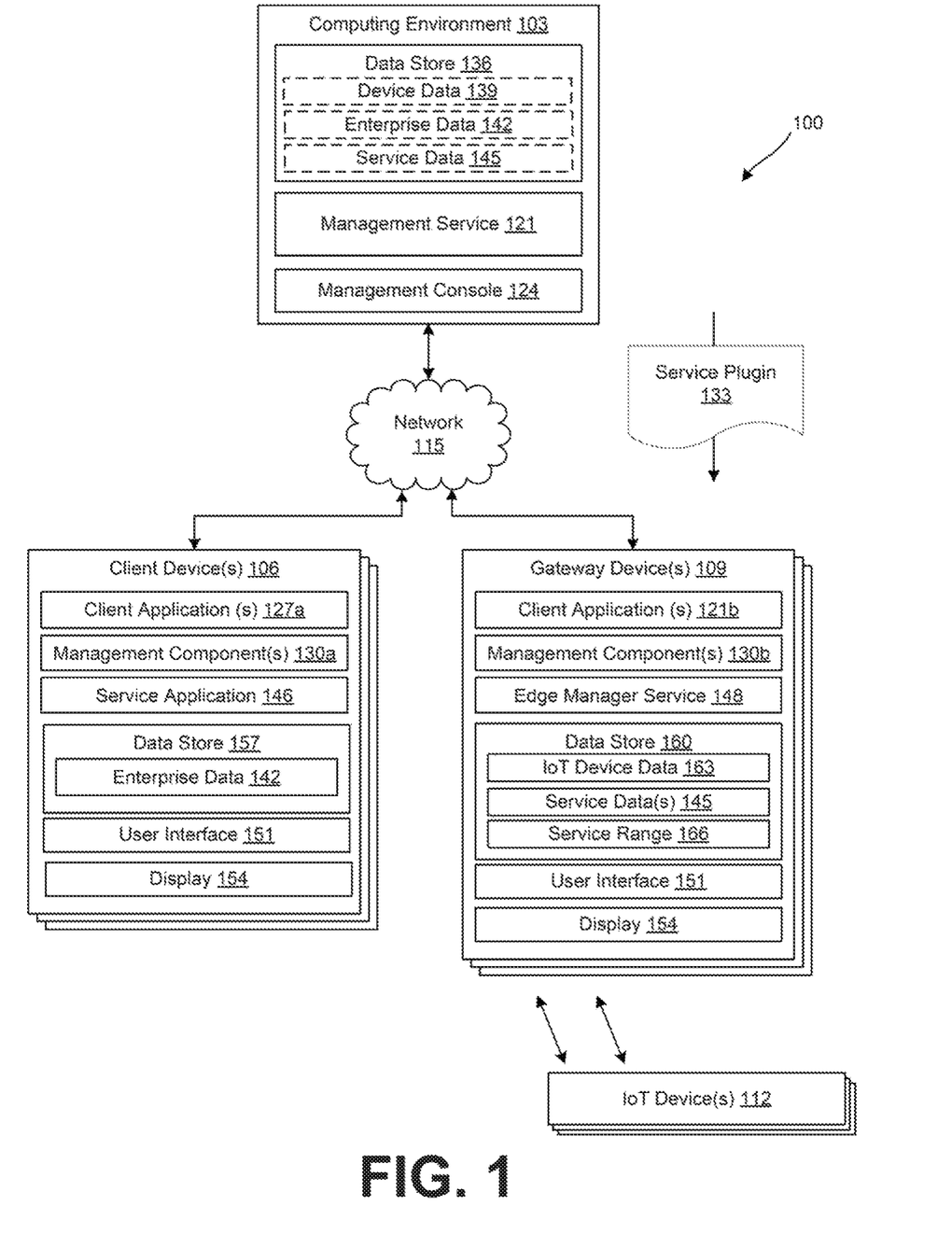
FIG. 1 is a drawing of an example of a networked environment, including a computing environment, a client device, a gateway device, and IoT devices.

With reference to FIG. 1, shown is art example of a networked environment 100. The networked environment 100 can include a computing environment 103, client devices 106, gateway devices 109, and Internet-of Things (IoT) devices 112 in communication with one another over a network 115. The IoT devices 112 connect to the network 115 through the gateway devices 109. The network 115 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environment 103 can include a grid computing resource or any other distributed computing arrangement. The computing devices can be located in a single installation or can be distributed among many different geographical locations. The computing environment 103 can also include or be operated as one or more virtualized computer instances. For purposes of convenience, the computing environment 103 is referred to herein in the singular. Even though the computing environment 103 is referred to in the singular, it is understood that a plurality of computing environment 103 can be employed. As the computing environment 103 communicates with the client devices 106, gateway devices 109, and IoT devices 112 remotely over the network 115, the computing environment 103 can be described as a "remote" or "cloud" computing environment 103.

The components executed on the computing environment 103 can include, for example, a management service 121, a management console 124, as well as other applications, services, processes, systems, engines, or functionality not discussed in detail herein. The management service 121 can oversee the management and operation of the client devices 106, gateway devices 109, and/or IoT devices 112. In some examples, an enterprise, such as one or more companies or other organizations, can operate the management service 121 to oversee or manage the operation of the client devices 106 of its employees, contractors, customers, or other users having user accounts with the enterprise. In addition, the enterprise can operate the management service 121 to manage gateway devices 109 and/or other edge devices as well as the IoT devices 112 accessible to the enterprise. In some implementations, the management service 121 can provide functionality using application program interfaces (APIs). To this end, an API of the management service 121 can provide enrollment information regarding a device, such as whether the device is enrolled with the management service 121.

The management console 124 can provide an administrative interface for configuring the operation of the management service 121 and the configuration of client devices 106, gateway devices 109, anchor IoT devices 112 that are managed by the management service 118. Accordingly, the management console 124 can correspond to a web page or web application provided by a web server hosted in the computing environment 103. For example, the management console 124 can provide an interface for an administrative user to define configuration profiles and/or authentication parameters for client device 106, gateway devices 109 and/or IoT devices 112, as well as various other actions related to the operation of various implementations.

The management service 121 can cause various software components to be installed on a client device 106, gateway devices 109, and IoT devices 112. Such software components can include, for example, client applications 127 (e.g., client application 127a, client application 127b), resources, libraries, drivers, device configurations and profiles, or other similar components that require installation on the client device 106 and/or gateway device 109 as specified by an administrator of the management service 118. The management service 121 can further cause policies to be implemented on a client device 106, gateway device 109, and/or IoT devices 112. Policies can include, for example, restrictions or permissions pertaining to capabilities of a client device 106, gateway device 109, and/or IoT device 112.

The management service 121 can interact with one or more client applications 127 executed on the client device 106 and/or gateway device 109 to perform management functions. In one example, the management service 121 can interact with a management component 130 (e.g., management component 130a, management component 130b) on a client device 106 and/or gateway device 109 to enroll the client device 106 and/or gateway device 109 with the management service 121. When enrolled, the management component 130 can be registered as a device administrator of the client device 106 and/or gateway device 109, which can provide the management component 130 with sufficient privileges to control the operation of the client device 106 and/or gateway device 109. In one example, the management component 130 can be registered as the device administrator through the installation of a management profile at the operating system of the client device 106 and or gateway device 109 that causes the operating system to designate the management component 130 as the device administrator.

The management service 121 can direct the management component 130 to perform device management functions on the client device 106 and/or gateway device 109. For example, the management service 118 can direct the management component 130 to control access to certain software or hardware functions available on the client device 106. In some implementations, the management service 121 can remotely configure the client device 106 and/or gateway device 109 by interacting with the management component 130 executed on the client device 106 and or gateway device 109. In some implementations, the management service 121 can generate service plugins 133 that correspond to service functionality to be implemented by a particular gateway device 109. The service plugin 133 can be installed to allow the gateway device 109 to operate as desired according to a given context (e.g., meeting room set up, activate printer, parking spot locator, obtain environmental data, etc.). According to various implementations, different gateway devices 109 can perform different services requested by managed devices 106 by interacting with IoT devices 112. The management service 121 can define what services a particular gateway device 109 can perform based on a location of the gateway device 109 and/or a given context. According to various implementations, the service plugin 133 can be managed remotely by the management service 121 and can be updated at any time.

The management service 121 can further provision data to the client device 106 and/or gateway device 109 through the management component 130. In one example, the management service 121 can cause the management component 130 to control the use of the client device 106 and/or gateway device 109 or provision data to the client device 106 and/or gateway device 109 through use of a command queue provided by the management service 121. In some examples, the management service 121 can store commands in a command queue associated with a particular client device 106 and/or gateway device 109 and accessible by the particular client device 106 and/or gateway device 109.

In some examples, the management service 121 can transmit an instruction to an original equipment manufacturer (OEM) messaging service specific to the client devices 106 and/or gateway device 109 (e.g., ANDROID CLOUD MESSAGING SERVICE™ for ANDROID client devices) to cause the OEM specific messaging service to send an instruction to the operating systems of the client devices 106 and/or gateway device 109, which causes the client devices 106 and/or gateway devices 109 to retrieve data from the command queues provided by the management service 121. In other examples, the management component 130 is executed by such client device 106 and/or gateway device 109 to retrieve the contents of the command queue. In one example, the management component 130 can retrieve the contents of the command queue on a configured interval, such as every four hours, or upon detection of a certain event, such as detection of an unauthorized application being executed by the client device 106 and/or gateway device 109. The management service 121 can also push commands to the management component 130.

In any case, the management component 130 can receive the contents of the command queue from the management service 121. In one example, the contents of the command queue can include a service plugin 133 generated by the management service 121 that the management component 130b should cause to be installed on the gateway device 109. In another application, the command queue can include a command that the management component 130 should cause to be executed on toe client device 106 and/or gateway device 109. In another example, the contents of the command queue can include a resource or other client application 127 that the management component 130 should cause to be installed on the client device 106 and or gateway device 109, which the client device 106 and/or gateway device 109 can access through a specified uniform resource locator (URL).

The computing environment 103 can include a data store 136. The data store 136 can include memory of the computing environment 103, mass storage resources of the computing environment 103, or any other storage resources on which data can be stored by the computing environment 103. The data stored in the data store 136 can be associated with the operation of the various applications and/or functional entities described. The data stored in the data store 136 can include, for example, management data including device data 139, enterprise data 142, service data 145, as well as other data.

Device data 139 can include data associated with a configuration of each client device 106, gateway device 109, and IoT device 112, and can include an identifier of the client device 106, gateway device 109, and IoT device 112. The identifier can be a serial number, a device identifier, a unique device identifier (UDID), a media access control (MAC) address, an internet protocol (IP) address, or another identifier that uniquely identifies a device with respect to other devices. In addition, the device data 139 can include an enrollment status indicating whether client device 106, gateway device 109, and IoT device 112 is enrolled with or managed by the management service 121. A client device 106, gateway device 109, and IoT device 112 designated as "enrolled" can be permitted to access the enterprise data 142 while a client device 106, gateway device 109, and IoT device 112 designated as "not enrolled," or having no designation, can be denied access to the enterprise data 142.

Additionally, device data 139 can include indications of the state of devices including the client device 106, gateway device 109, and IoT device 112. For instance, these indications can specify applications that are installed on the client device 106, gateway device 109, and IoT device 112, configurations or settings that are applied to each of the devices, user accounts or service accounts associated with each of the devices, the physical locations of each of the devices, the network to which each of the devices is connected, and other information describing the current state of each of the devices. While a user account can be associated with a particular person, in some cases a user account can be unassociated with any particular person, and can nevertheless be utilized for client device 106, gateway device 109, and IoT device 112 that provide certain functionalities, such as automatic functionalities. For example, a gateway device 109 can be associated with a service account that is unassociated with any person.

Device data 139 can also include data pertaining to user groups. An administrator can specify one or more of the client device 106, gateway device 109, and IoT device 112 as belonging to a user group. The user group can refer to a group of user accounts. User groups can be created by an administrator of the management service 121 such that a batch of client device 106, gateway device 109, and IoT device 112 can be configured according to common settings. For instance, an enterprise can create a user group for the marketing department and the sales department, where client device 106, gateway device 109, and IoT device 112 in the marketing department are configured differently from the client device 106, gateway device 109, and IoT device 112 in the sales department.

Enterprise data 142 can include email, corporate documents, social media, messages, enterprise applications, confidential documents, and other enterprise content or communications. Service data 145 can data associated with the different types of services that a gateway device 109 can perform. For example, the service data 145 can include service plugin configurations, a version of a service plugin 133 installed on a gateway device 109, an identification of the IoT devices 112 connected a particular gateway 109, IoT metric data obtained from interactions with the IoT devices 112, and/or other data as can be appreciated.

The client device 106 can be representative of one or more client devices 106. The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include an operating system configured to execute various applications, such as client applications 127, a management component 130, a service application 146, and/or other applications. Some client applications 127 can access network content served up by the computing environment 103 or other servers, thereby rendering a user interface 151 on a display 154, such as a liquid crystal display (LCD), touch-screen display, or other type of display device. To this end, some client applications 127 can include a web browser or a dedicated application, and a user interface can include a network page, an application screen, or other interface. Further, other client applications 127 can include device management applications, enterprise applications, social networking applications, word processors, spreadsheet applications, media viewing applications, or other applications.

The service application 146 can interact with the edge manager service 148 of a gateway device 109 to benefit from services associated with the gateway device 109. For example, the service application 146 can render a user interface 151 in which a user can request services associated with a given context. Further, the service application 146 can interact with the edge manager service 148 of the gateway device 109 to receive information associated with the requested service that can be presented to a user through the user interface 151. In some implementations, the service application 146 can interact with the edge manager service 148 without user interaction.

In some implementations, the service application 146 can connect with the edge manager service 148 using a near-field communication (NFC) mechanism, such as, for example. Nearby software development kits (SDKs). For example, the service application 146 and/or the management component 130a can receive broadcasted signals from a gateway device 109. Upon detecting the presences of a gateway device 109 through receipt of a broadcasted signal, the service application 146 and/or the management component 130a can connect with the gateway device 109 to establish a communication channel. As such, the client device 106 and the gateway device(s) 109 can communicate when disconnected from the enterprise network. In some implementations, the service application 146 can be integrated with the management component 130a. In other implementations, the service application 146 can be a standalone application that is separate from the management component 130a.

The client device 106 can also include a data store 157. The data store 157 can include memory of the client devices 106 or any other storage resources on which data can be stored by the client device 106. The data store 157 can include enterprise data 142 and/or other data. The data store 157 can include other data associated with the client application 127, the operating system, the management component 130, and the service application 146.

The gateway device 109 can be representative of one or more gateway devices 109. The gateway device 109 can include a processor, network communication hardware, and a memory including executable instructions for communicating with the management service 121, client device 106, and/or IoT devices 112. The IoT device 112 can also be equipped with networking capability or networking interfaces, including a localized networking or communication capability, such as a near-field communication (NFC) capability, radio-frequency identification (RFID) read or write capability, or other localized communication capability.

While referred to as a gateway, the gateway device 109 can also be representative of routing switches, integrated access devices (IADs), multiplexers, and a variety of metropolitan area network (MAN) and wide area network (WAN) access devices, and other edge devices. The gateway device 109 can perform functionalities and execute applications stored in a data store 160. For example, the gateway device 109 can execute client applications 127, a management component 130b, an edge manager service 148, and other applications. The edge manager service 148 can interact with the client device 106 and/or IoT device 112 to perform the functionalities associated with services provided by the gateway device 109 as configured by the management service 121. In some implementations, the gateway device 109 can provide network access to the IoT devices 112, as well as implement enrollment processes and gathering IoT metric data based on IoT device 112 communications with the gateway device 109.

In one example, the edge manager service 148 can generate a user interface 151 that can be rendered on a display 154 to allow a user and/or administrator to view service data 145 and/or other data associated with the gateway device 109. For example, the user interface 151 could include information related to the detected devices 106 within the predefined range of the gateway device 109, an identification of IoT devices 112 in communication with the gateway device 109, and/or other information. In some implementations, the gateway device 109 can generate a user interface 151 that includes IoT metric data obtained from the IoT devices 112. For example, in the parking spot availability example, a gateway device 109 can be located at the entry of a parking lot and can display a user interface 151 that includes a listing of available spots as determined from the parking sensor IoT device(s) 112.

In some implementations, the edge manager service 148 can detect client devices 106 located within a predefined range of the location of the gateway device 109 using near-field communication. For example, the edge manager service 148 can broadcast signals that can be received by listening client devices 106 that are within the predefined boundary of the gateway device 109. As such, the gateway devices 109 can communicate with the client devices 106 using a communication channel that can be established without requiring the devices to be connected to the enterprise network.

In some implementations, the edge manager service 148 and/or management component 130b can authenticate any client device 106 within the service range 166 of the gateway device 109. For example, when a client device 106 is located and detected within the predefined service range 166 of the gateway device 109, the edge manager service 148 and or the management component 130b can communicate with the management service 121 to verify the client device 106 and determine whether the client device 106 is authorized to receive provided service.

The gateway device 109 can also include a data store 160. The data store 160 can include memory of the gateway device 109 or any other storage resources on which data can be stored by the gateway device 109. The data store 160 can include IoT device data 163, service data 145, a service range 166, and/or other data. The data store 160 can include other data associated with the client application 127, the management component 130, and the edge manager service 148.

The IoT device data 163 can include data associated with the IoT devices 112 in communication with the gateway device 109. For example, as different IoT devices 112 can have different communication protocols, the IoT device data 163 can include communication protocols required for interacting with an IoT device 112. The service range 166 can include a range that defines the location range surrounding the gateway device 109 in which a client device 106 is required to be in before a communication channel can be established between the client device 106 and the gateway device 109. In some implementations, the service range 166 is defined by the management service 121 (e.g., administrator input). In other implementations, the service range 166 is defined according to device capabilities (e.g., network capabilities).

The IoT devices 112 can be appliances, vehicles, sensors, controllers, actuators, and other physical devices including at least: a processor, network communication hardware, and a memory including executable instructions for communicating with a gateway device 109. The IoT device 112 can be representative of one or more IoT devices 112. The IoT device 112 can include appliances, vehicles, sensors, controllers, actuators, monitors, phones, tablets, thermostats, speakers, and other devices and can incorporate processor-based systems, such as a computer system or any other device with like capability.

The IoT device 112 can also be equipped with networking capability or networking interfaces, including a localized networking or communication capability, such as a near-field communication (NFC) capability, radio-frequency identification (RFID) read or write capability, or other localized communication capability. In some examples, the IoT device 112 is mobile where the IoT device 112 is easily portable from one location to another. In other situations, the IoT device 112 can be a thermostat, fixture, or other device that is not easily portable.

Next, a general description of the operation of the components of the networked environment 100 is provided. To begin, a client device 106 and gateway device 109 can enroll with a management service 121 that manages devices within an enterprise. The management service 121 can generate and configure service plugins 133 that define the services of and behavior for a given gateway device 109 for a given context. The services can be based on a location of the given gateway device 109 and a given context. For example, if the gateway device 109 is located in a meeting room, the context can be a meeting, and the services provider by the gateway device 109 can relate to setting up the meeting room for a particular meeting by interacting with IoT devices 112 in the meeting room. In some implementations, the services of a given gateway device 109 can be defined by an administrator using a management console 124 to define the services, functionality, permissions, and/or restrictions of a particular gateway device 109 for a given context.

When a managed client device 106 is within a predefined service range 166 of a gateway device 109, the services provided by the gateway device 109 can be available to the managed client device 106. In some implementations, the managed client device 106 and the gateway device 109 can establish a communication channel by using near-field communication mechanisms such that when the client device 106 is within the service range 166 of the gateway device 109, the client device 106 can interact with the gateway device 109. As such, the managed client device 106 and the gateway device 109 can interact with one another even if the managed client device 106 and/or the gateway device 109 are offline from the enterprise network.

In other implementations, the managed client device 106 and the gateway device 109 can communicate through other communication networks as can be appreciated. However, the gateway device 109 can determine not to interact with the managed client device 106 if the managed client device 106 is outside of the service range 166 of the gateway device. For example, if a managed client device 106 requests to print a document at a primer IoT device 112 and the managed client device 106 is outside of the service range 166, the gateway device 109 will not interact with the primer to perform the service. However, when the managed client device 106 is determined to be within the service range 166, the gateway device 109 can receive the service request and proceed with completion of the task by instructing the IoT device 112 to print the document.

In some implementations, upon detection of a client device 106, the gateway device 109 can authenticate the client device 106 through the management service 121. For example, the gateway device 109 can obtain identifying information (e.g., device identifier) from the client device 106 and request authentication from the management service 121 prior to proceeding with additional interactions with the client device 106. The management service 121 can notify the gateway device 109 of whether the client device 106 is authorized to avail the services associated with the gateway device 109. In some implementations, the management service 121 can notify the gateway device 109 of any restrictions and/or permissions associated with the services that pertain to the managed client device 106, associated user, and/or associated user group.

In some implementations, the service application 146 of the client device 106 can generate a service request and transmit the service request to the edge manager service 148 to request the services provided by the gateway device 109. In some examples, the service request is in response to a user input to a user interface 151 associated with the service application 146 on the client device 106. For example, a user can select a selectable component of the user interface 151, provide an auditory input, gesture input, and/or other input that can be identified as a request for the service associated with the gateway device 109. In other examples, the service application 146 can automatically generate a service request to transmit to the edge manager service 148 of the gateway device 109 in response to the client device 106 being within the service range 166 of the gateway device 109 and establishing communication with the gateway device 109.

The gateway device 109 can receive the service request and interact with the connected IoT device 112 to satisfy the service as defined by the management service 121. For example, the gateway device 109 can communicate with one or more IoT devices 112 to obtain metric data and/or to instruct the IoT device 112 to perform a task as defined by the management service 121 and/or corresponding service plugin 133.

In some examples, the gateway device 109 can generate a notification that can be transmitted to the client device 106 with respect to the request. For example, the notification can include requested IoT metric data, a notification of a task performance, and/or other information associated with the service request.

Figure 2:
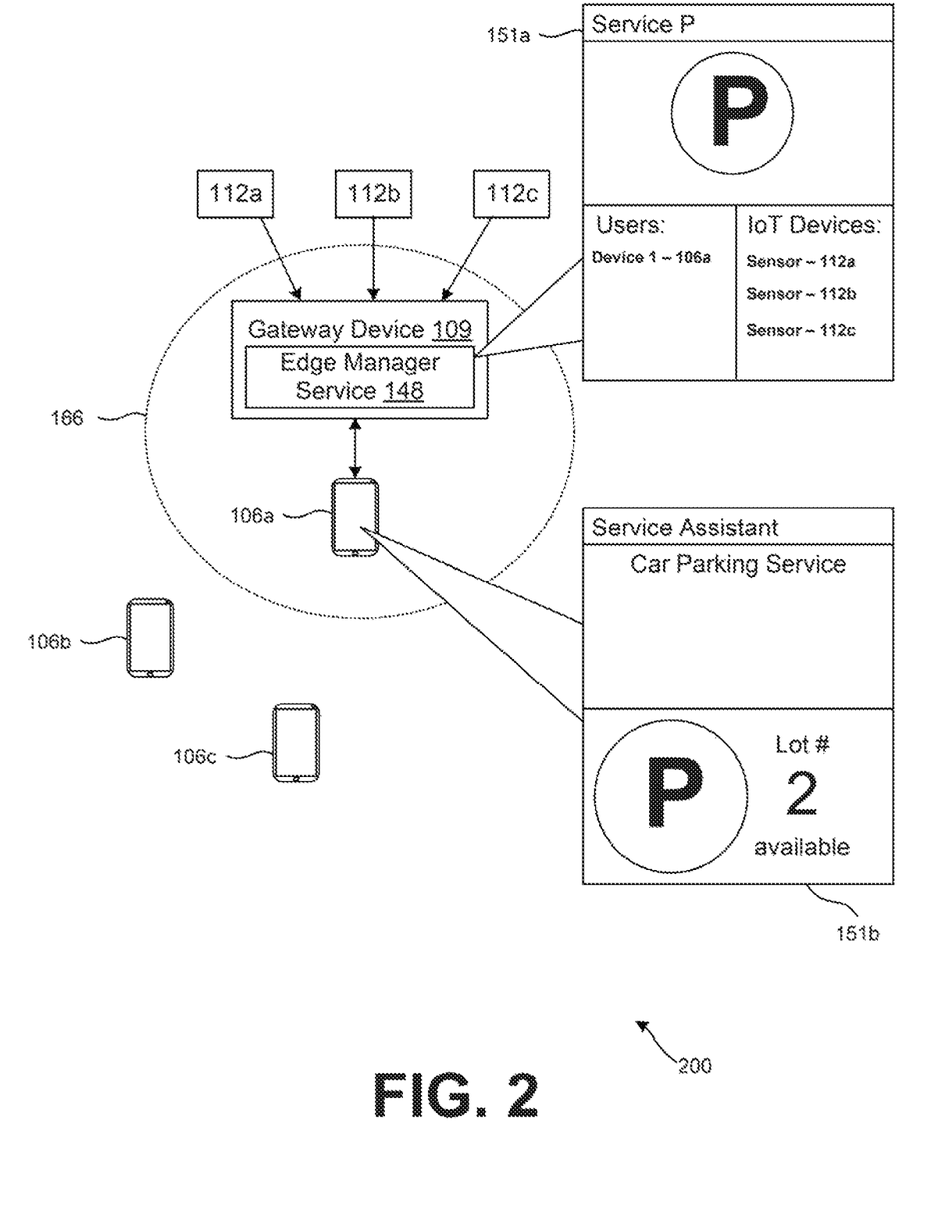
FIG. 2 is a drawing of an example scenario of components of the network environment of interacting with one another.

Turning now to FIG. 2, shown is drawing of an example scenario implemented by the components of the networked environment 100 of FIG. 1 according to various examples.

In particular, the example scenario 200 includes client devices 106a-c, a gateway device 109 and IoT devices 112a, 112b, 112c. The context associated with the example scenario is a parking lot scenario where client devices 106 can interact with the gateway device 109 to determine available parking spots in a particular location. In the example of FIG. 2, client device 106a is located within the service range 166 of the gateway device 109 while client devices 106b and 106c are located outside of the service range 166. As such, only client device 106a can avail the services associated with the gateway device 109.

As shown in FIG. 2, the gateway device 109 is in communication with the client device 106a and the IoT devices 112a, 112b, 112c. In some implementations, the edge manager service 148 can generate a user interface 121a which can include information related to the services associated with eh gateway device 109. In the example of FIG. 2, the user interface 121a include information related to connected client devices 106 and connected IoT devices 112. In this example, the gateway device 109 can receive a request from the client device 106a with respect to determining available parking spots. In this example, the IoT devices 112 can correspond to sensors that can detect available parking spots. The gateway device 109 can interact with one or more of the connected IoT devices 112 to determine available parking spots based on the IoT metric data obtained from the IoT device(s) 112. Once the gateway device 109 obtains the IoT metric data, the gateway device 109 can notify the client device 106a of the available spots. As shown in FIG. 2, client device 106a is displaying a user interface 151b that includes the information obtained by the gateway device 109 from the IoT devices 112.

Figure 3:
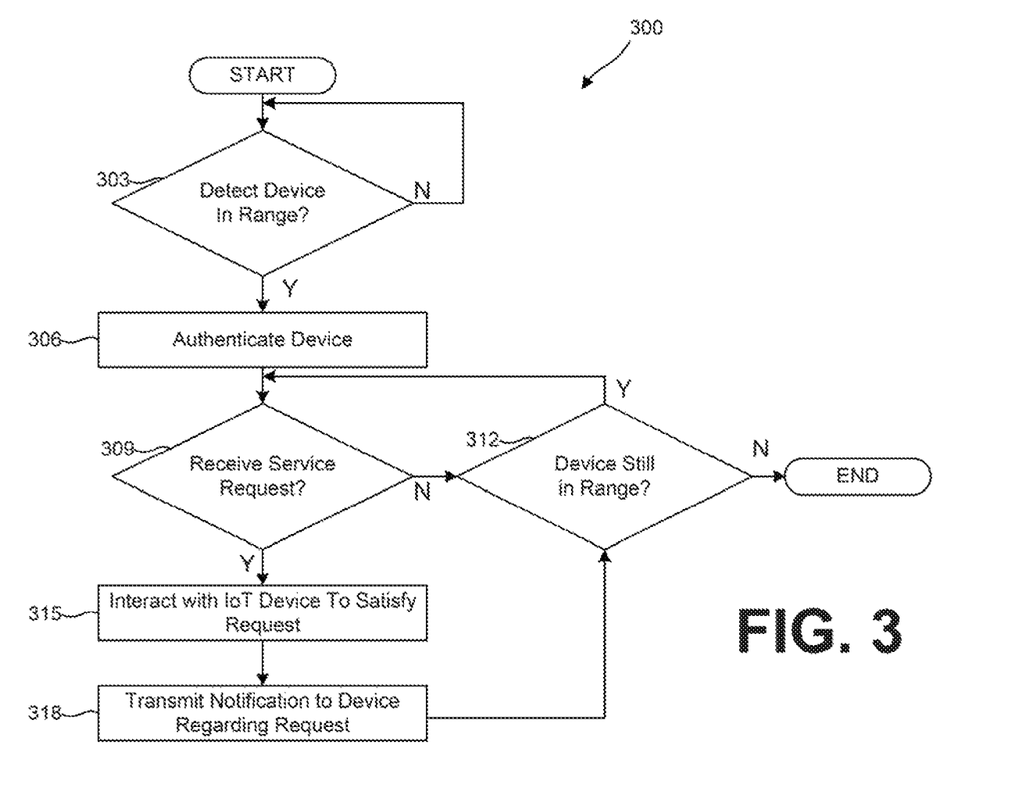
FIGS. 3-5 are example flowcharts illustrating functionality implemented by components of the networked environment.

Moving on to FIG. 3, shown is a flowchart that provides one example of the operation of a portion of the gateway device 109. The flowchart of FIG. 3 can be viewed as depicting an example of elements of a method implemented by the management component 130b, the edge manager service 148, or other suitable software component according to one or more examples. The separation or segmentation of functionality as discussed herein is presented for illustrative purposes only.

In step 303, the edge manager service 148 detects whether a client device 106 is located within the service range 166 associated with the service provided by the gateway device 109. For example, the gateway device 109 can communicate with client devices 106 using NFC capabilities. In this example, a gateway device 109 can broadcast a signal identifying itself to the network. Any listening client device 106 that receives the signal can respond to the gateway device 109 notifying the gateway device 109 of its presence. In some examples, the gateway device 109 can determine the location of the responding device 106 to determine whether the client device 106 is within the service range 166. For example, the client device 106 can provide the gateway device 109 with a device location. In other examples, any responding client device 106 can be considered to be within the service range 166. If a device 106 is not detected, the edge manager service 148 continues to wait for a detected device 106. Otherwise, the edge manager service 148 proceeds to step 309.

In step 306, the edge manager service 148 or management component 130b authenticates the detected client device 106. For example, the edge manager service 148 or the management component 130b can communicate with the management service 121 to determine whether the detected client device 106 is authorized to interact with the gateway device 109 and receive the services provided by the gateway device 109. In some implementations, the edge manager service 148 or the management component 130b can transmit an authentication request containing a device identifier of the client device and/or other type of identifying feature to determine whether the client device 106 is authorized. The management service 121 can authenticate the client device 106 and send a notification to the edge manager service or the management component 130b notifying the gateway device 109 that the client device is authorized to interact with the gateway device 109.

In step 309, the edge manager service 148 can receive a service request from the client device 106. In one example, the service request can be a request for IoT metric data (e.g., parking information, patient data, temperature data, etc.) that can be obtained according to the configuration of the gateway device 109 for a given context and interactions with IoT devices 112. In other examples, the service request can be a request to perform a function (e.g., set up IoT devices 112 for a pending meeting, print document, etc.) associated with the services provided by the gateway device 109. If a service request is not received, the edge manager service 148 proceeds to step 312. Otherwise, the edge manager service 148 proceeds to step 315.

In step 312, the edge manager service 148 determines whether the client device 106 is still within the service range 166. If the client device 106 is still within the service range 166, the edge manager service 148 returns to step 309. Otherwise, the process can proceed to completion.

In step 315, the edge manager service 148 interacts with an IoT device 112 to satisfy the request. In some implementations, the edge manager service 148 obtains IoT metric data (e.g., temperature, available parking spots, etc.) from the IoT device 112 with respect to the given context. In other implementations, the edge manager service 148 requests that that the IoT device 112 perform a particular function (e.g., turn on device, set temperature at particular setting, print document, change channel, provide patient data, etc.). According to various examples, the edge manager service 148 interacts with the IoT device 112 as configured by the management service 121 and service plugin 133. The edge manager service 148 can interact with the IoT device 112 using communication protocols defined in the service data 145 and/or other data.

In step 318, the edge manager service 148 can transmit a notification to the requesting managed client device 106 with respect to the service. For example, if the request is for IoT metric data, the notification can include the IoT metric data obtained from the IoT device 112 as defined by the management service 121. In another example, if the request relates to a completion of a function, the notification can be a notification of a completion, a start, an error, and/or other type of notification that can be presented to the client device 106 with respect to the requested service. Upon transmitting the notification to the client device 106, the edge manager service 148 proceeds to step 312 to determine whether the client device 106 is still in the service range 166.

Figure 4:
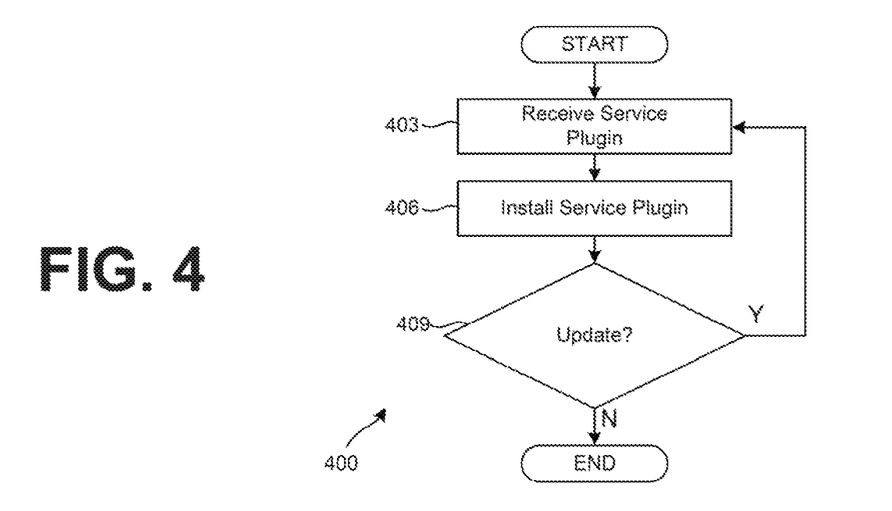

Moving on to FIG. 4, shown is a flowchart that provides one example of the operation of a portion of the gateway device 109. The flowchart of FIG. 4 can be viewed as depicting an example of elements of a method implemented by the management component 130b, the edge manager service 148, or other suitable software component according to one or more examples. The separation or segmentation of functionality as discussed herein is presented for illustrative purposes only.

In step 403, the management component 130b or edge manager service 148 can receive a service plugin 133 from the management service 121. In some implementations, the management service 121 pushes the service plugin 133 to the management component 130b or the edge manager service 148. In other examples, the management component 130b or edge manager service 148 receives the service plugin 133 from a command queue of the management service 121. The service plugin 133 contains software components that define the behavior of the gateway device 109 with respect to a particular service for a given context. For example, the service plugin 133 can define the services of the gateway device 109 as desired according to a given context (e.g., meeting room set up, activate printer, parking spot locator, obtain environmental data, etc.). In various implementations, the service plugin 133 can define how a gateway device 109 can communicate with an IoT device 112 to obtain the required metric data from the IoT device 112.

In step 406, the management component 130b or the edge manager service 148 installs the service plugin 133. In some implementations, the service plugin 133 can be an independent application. In other implementations, the service plugin 133 can be integrated within the management component 130b, the edge manager service 148, or other suitable software component. Once installed, the gateway device 109 can perform the corresponding services for managed client devices 106 within the predefined range of the gateway device location.

In step 409, the management component 130b or the edge manager service 148 can determine if there is an update to the service plugin 133. The management service 121 can remotely manage the operation of the gateway device 109 through the service plugin 133 and service plugin updates. If there is a service plugin update, the management component 130b or the edge manager service 148 can return to step 403 to receive the updated service plugin 133. Otherwise, the process can proceed to completion.

Figure 5:
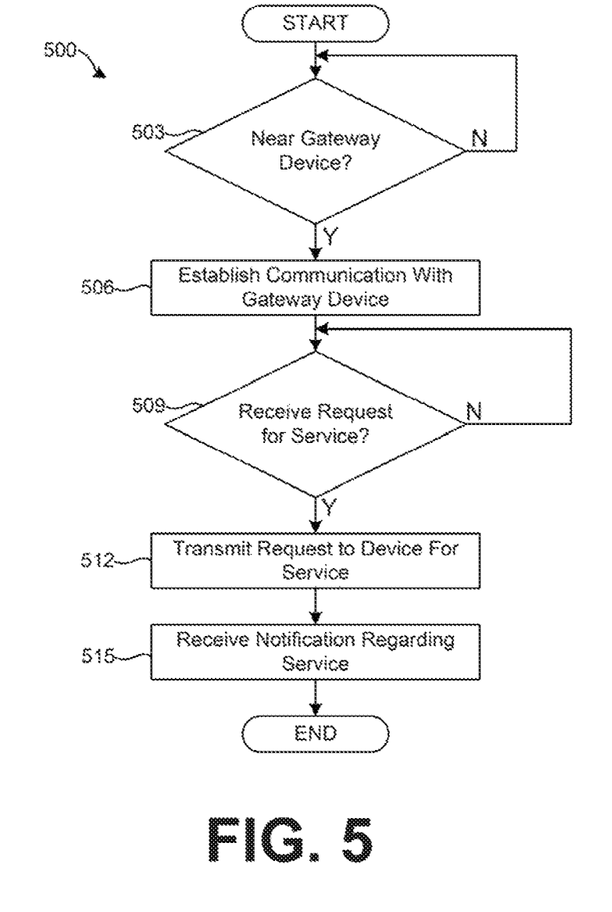

Moving on to FIG. 5, shown is a flowchart that provides one example of the operation of a portion of the client device 106. The flowchart of FIG. 5 can be viewed as depicting an example of elements of a method implemented by the management component 130a, the service application 146, client application 127a, or other suitable software component according to one or more examples. The separation or segmentation of functionality as discussed herein is presented for illustrative purposes only.

In step 503, the management component 130a or the service application 146 can detect a gateway device 109. For example, the client device 106 can be equipped with a near-filed communication capability that allows the client device 106 to detect a gateway device 109 when the client device 106 is located within the service range 166 of the gateway device 109 for NFC communications. In this example, the client device 106 can receive a broadcasted signal from the gateway device 109 when the client device 106 is within the service range 166 of the gateway device 109. If a gateway device 109 is undetected, the management component 130a or the service application 146 remains at step 503. Otherwise, the management component 130a or the service application 146 can proceed to step 506.

In step 506, the service application 146 and/or management component 130b can establish communication with the gateway device 109. In some implementations, the client device 106 and the gateway device 109 can establish communication using near-field communication mechanisms. In other implementations, the client device 106 and the gateway device 109 can establish a communication channel through other networking mechanisms. In some examples, the client device 106 and/or gateway device 109 can establish communication with one other following an authentication process through the management service 121. For example, prior to interacting, the client device 106 and/or the gateway device 109 can authenticate the other device by inquiring with the management service 121 to verify that the client device 106 and/or the gateway device 109 are allowed to communicate with one another.

In step 509, the service application 146 determines whether a request for a service is received. In some implementations, a service request can be received by a user input through a user interface 151 associated with the service application 146. For example, the service application 146 can generate a user interface 151 corresponding to the services associated with the detected gateway device 109. The user interface 151 can include information associated with the services available to the managed user device 106 and/or user of the managed user device 106 with respect to the particular gateway device 109. For example, in the parking spot example, the user interface 151 can include an identification of the parking lot, a selectable component for requesting an available parking spot and/or other information. The service request can be received by a user selecting a selectable component on the user interface 151, an audible request that can be detected by the service application 148, a gesture input, and/or other type of input. In other implementations, a service request can be automatically generated in response to establishing a communication with the gateway device 109. For example, the service application 146 and/or the management component 130a can automatically generate a service request upon connection between the client device 106 and the gateway device 109. If a service request has not been received, the service application 146 continues to wait for a service request. Otherwise, the service application 146 proceeds to step 512.

In step 512, the service application 146 can transmit the service request to the gateway device 109. In some examples, the service request can be a request for IoT metric data (e.g., parking information, patient data, temperature data, etc.) that can be obtained according to the configuration of the gateway device 109 for a given context and interactions with an IoT device 112. In another example, the service request can be a request to perform a function (e.g., set up IoT devices 112 for a pending meeting, print document, etc.) associated with the services provided by the gateway device 109.

In step 515, the service application 146 can receive a notification from the gateway device 109 regarding the service. For example, the notification can include IoT metric data associated with the service that gateway device 109 obtained from an IoT device 112. In other examples, the notification can include a notification that a particular function associated with the service has been performed. In some implementations, the service application 146 can generate a user interface 151 including the notification and render the user interface 151 on the display 154 of the client device 106. Thereafter, the process can proceed to completion.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape or other memory components.

Memory can include both volatile and nonvolatile memory and data storage components. Also, a processor can represent multiple processors or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the management service 121, client applications 127, management components 130, service application 146, edge manager service 148, and other various services and functions described can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gales, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

What is claimed is:

1. A system for enabling users to interact with internet of things (IoT) devices in an enterprise, the system comprising:
   a gateway device enrolled in a management service associated with the enterprise, the management service controlling an operation of the gateway device; and
   at least one application executable in the gateway device, wherein the at least one application, when executed, causes the gateway device to:
      obtain a service plugin from a command queue that is associated with the gateway device and accessible by the gateway device, the service plugin being stored in the command queue by the management service, the service plugin providing instructions associated with performing a service provided by the gateway device according to a given context and a location of the gateway device, the service provided by the gateway device for the given context being defined by an administrator of the management service, and the service plugin being generated by and remotely managed by the management service;
      install the service plugin;
      broadcast a signal identifying the gateway device to a network;
      receive a response to the signal from a client device indicating a client device presence relative to the gateway device, the client device being enrolled in the management service;
      determine that the client device is located within a service range of the gateway device, the service range being administrator-defined;
      receive a service request from the client device;
      authenticate the client device by communicating with the management service to determine that the client device is authorized to receive the service associated with the service request;

cause the service request to be satisfied by interacting with an IoT device in communication with the gateway device as defined by the service plugin; and transmit a notification to the client device, the notification comprising at least one of IoT metric data associated with the IoT device or a service status.

2. The system of claim 1, wherein the service request comprises a request for data obtained by the IoT device and when executed, the at least one application further causes the gateway device to at least:

receive data from the IoT device; and transmit the data to the client device.

3. The system of claim 1, wherein the IOT device comprises s first IOT device and a second IOT device, and the service request comprises a request for the first IoT device to perform a first task and the second IOT device to perform a second task.

4. The system of claim 1, wherein detecting that the client device is located within the service range is based at least in part on a near-field communication.

5. The system of claim 1, wherein when executed, the at least one application further causes the gateway device to at least:

determine a permission associated with the client device; and determine that the service request can be fulfilled according to the permission.

6. The system of claim 1, wherein when executed, the at least one application further causes the gateway device to at least detect that the client device is outside of the service range of the gateway device.

7. The system of claim 1, wherein:

the service request comprises a request for IoT metric data associated with the IoT device, satisfying the service request comprises obtaining the IoT metric data, and when executed, the at least one application further causes the gateway device to at least:

generate the notification to include the IoT metric data.

8. A computer-implemented method for enabling users to interact with internet of things (IoT) devices in an enterprise, the method comprising:

obtaining, by a gateway device, a service plugin from a command queue that is associated with the gateway device and accessible by the gateway device, the service plugin being stored in the command queue by a management service, the service plugin providing instructions associated with performing a service provided by the gateway device according to a given context and a location of the gateway device, the service provided by the gateway device for the given context being defined by an administrator of the management service, and the service plugin being generated by and remotely managed by the management service;

installing, by the gateway device, the service plugin;

broadcasting, by the gateway device, a signal identifying the gateway device to a network;

receiving, by the gateway device, a response to the signal from a client device indicating a client device presence relative to the gateway device, the client device being enrolled in the management service, and the management service controlling a respective operation of the gateway device and the client device;

determining, by the gateway device, that the client device is located within a service range of the gateway device, the service range being administrator-defined;

receiving, by the gateway device, a service request from the client device;

authenticating, by the gateway device, the client device by communicating with the management service to determine that the client device is authorized to receive the service associated with the service request;

causing the service request to be satisfied by interacting, by the gateway device and as defined by the service plugin, with an IoT device in communication with the gateway device; and transmitting, by the gateway device, a notification to the client device, the notification comprising at least one of IoT metric data associated with the IoT device or a service status.

9. The computer-implemented method of claim 8, wherein the service request comprises a request for data obtained by the IoT device and further comprising:

receiving, by the gateway device, data from the IoT device; and transmitting, by the gateway device, the data to the client device.

10. The computer-implemented method of claim 8, wherein the IOT device comprises s first IOT device and a second IOT device, and the service request comprises a request for the first IoT device to perform a first task and the second IOT device to perform a second task.

11. The computer-implemented method of claim 8, wherein detecting that the client device is located within the service range is based at least in part on a near-field communication.

12. The computer-implemented method of claim 8, further comprising:

determining a permission associated with the client device; and determining that the service request can be fulfilled according to the permission.

13. The computer-implemented method of claim 8, further comprising detecting, by the gateway device, that the client device is outside of the service range of the gateway device.

14. The computer-implemented method of claim 8, wherein:

the service request comprises a request for IoT metric data associated with the IoT device, satisfying the service request comprises obtaining the IoT metric data, and further comprising generating the notification to include the IoT metric data.

15. A non-transitory computer-readable medium embodying a program executable in a gateway device, wherein when executed, the program causes the gateway device to at least:

obtain a service plugin from a command queue that is associated with the gateway device and accessible by the gateway device, the service plugin being stored in the command queue by a management service, the service plugin providing instructions associated with performing a service provided by the gateway device according to a given context and a location of the gateway device, the service provided by the gateway device for the given context being defined by an administrator of the management service, and the service plugin being generated by and remotely managed by the management service;

install the service plugin;

broadcast a signal identifying the gateway device to a network;

receive a response to the signal from a client device indicating a client device presence relative to the gateway device, the client device being enrolled in the management service, and the management service controlling a respective operation of the gateway device and the client device;

determine that the client device is located within a service range of the gateway device, the service range being administrator-defined;

receive a service request from the client device;

authenticate the client device by communicating with the management service to determine that the client device is authorized to receive the service associated with the service request;

cause the service request to be satisfied by interacting with an IoT device in communication with the gateway device as defined by the service plugin; and transmit a notification to the client device, the notification comprising at least one of IoT metric data associated with the IoT device or a service status.

16. The non-transitory computer-readable medium of claim 15, wherein the service request comprises a request for data obtained by the IoT device wherein when executed, the program further causes the gateway device to at least:

receive data from the IoT device; and transmit the data to the client device.

17. The non-transitory computer-readable medium of claim 15, wherein the IOT device comprises s first IOT device and a second IOT device, and the service request comprises a request for the first IoT device to perform a first task and the second IOT device to perform a second task.

18. The non-transitory computer-readable medium of claim 15, wherein detecting that the client device is located within the service range is based at least in part on a near-field communication.

19. The non-transitory computer-readable medium of claim 15, wherein, when executed the program further causes the gateway device to at least:

determine a permission associated with the client device; and determine that the service request can be fulfilled according to the permission.

20. The non-transitory computer-readable medium of claim 15, wherein:

the service request comprises a request for IoT metric data associated with the IoT device, satisfying the service request comprises obtaining the IoT metric data, and when executed, the program further causes the gateway device to at least generate the notification to include the IoT metric data.

* * * * *